(12) United States Patent
Ahmed et al.

(10) Patent No.: US 11,333,598 B1
(45) Date of Patent: May 17, 2022

(54) MATERIAL DEGRADATION MONITORING SYSTEM

(71) Applicant: UNITED ARAB EMIRATES UNIVERSITY, Al Ain (AE)

(72) Inventors: Waleed Khalil Ahmed, Al Ain (AE); Muthanna Ahmed Aziz, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/386,482

(22) Filed: Jul. 27, 2021

(51) Int. Cl.
| G01N 17/04 | (2006.01) |
| H04L 67/125 | (2022.01) |
| G01N 17/00 | (2006.01) |
| G06K 19/07 | (2006.01) |

(52) U.S. Cl.
CPC ........... *G01N 17/04* (2013.01); *G01N 17/002* (2013.01); *H04L 67/125* (2013.01); *G06K 19/0723* (2013.01)

(58) Field of Classification Search
CPC .... G01N 17/04; G01N 17/002; H04L 67/125; G06K 19/0723
See application file for complete search history.

(56) References Cited

U.S. PATENT DOCUMENTS

| 2008/0204001 A1* | 8/2008 | May | H01F 13/003 |
| | | | 324/207.2 |
| 2015/0185134 A1* | 7/2015 | Chen | G01N 17/02 |
| | | | 340/539.1 |
| 2016/0061884 A1* | 3/2016 | Cho | G01R 31/2875 |
| | | | 324/750.13 |
| 2018/0126505 A1* | 5/2018 | Hackman | G06K 19/005 |

FOREIGN PATENT DOCUMENTS

| CN | 203480291 U | 3/2014 |
| CN | 104833627 A | 8/2015 |

OTHER PUBLICATIONS

Odeh et al., "A Remote Engineering Lab for Collaborative Experimentation", International Journal of Online Engineering (Ijoe), (2013), pp. 10-18, vol. 9, No. (3).
Da Silva et al., "Remote Experimentation: Integrating Research, Education, and Industrial Application", IFAC Proceedings Volumes (2007), pp. 102-107, vol. 40, Iss. 1.
Beghi et al., "A Remote Refrigeration Laboratory for Control Engineering Education", IFAC PapersOnLine (2015), pp. 25-30, vol. 48, Iss. 29.
Popescu et al., "Remote Laboratory for Learning in Control Engineering", IFAC Proceedings Volumes (2013), pp. 333-338, vol. 46, Iss. 17.

* cited by examiner

*Primary Examiner* — Farhana A Hoque
(74) *Attorney, Agent, or Firm* — Nath, Goldberg & Meyer; Richard C. Litman (57) ABSTRACT

The material degradation monitoring system includes a base plate; a test chamber located on the base plate; a material holding unit located on the base plate and spaced apart from the test chamber, the material holding unit being capable of holding at least one material to be tested; a material transfer unit located proximate to the material holding unit and test chamber; and a controller that directs the transfer unit to move the material holding unit to the test chamber.

13 Claims, 9 Drawing Sheets

MATERIAL DEGRADATION MONITORING SYSTEM

BACKGROUND

1. Field

This disclosure relates to corrosion testing apparatus, and particularly to a material degradation monitoring system having an automated test chamber that can be controlled and accessed remotely for use by students, researchers, and quality control organizations, e.g., to test the corrosion resistance of metals, alloys, composites, plastics, or other materials under various environmental conditions.

2. Description of the Related Art

Material degradation happens by the process of corrosion and oxidation in wet and dry environments, respectively. Corrosion is an electrochemical process, and there are several forms of damage, important among which are uniform corrosion, galvanic corrosion, stress corrosion cracking, and pitting and crevice corrosion. These damage modes affect the useful life of a component, and various preventive measures may be taken to minimize the effect. Corrosion preventive measures include neutralization, the addition of inhibitors, cathodic and anodic protection, painting and coating, etc. High-temperature damage, on the other hand, occurs by reaction of oxygen, sulfur or other compounds present in the environment.

Despite the numerous useful properties of iron and steel and the cultural changes that came along with the introduction of iron, it has to be kept in mind that iron and steel are plagued by rusting, also often referred to as corrosion or environmental interaction. Specifically, rusting destroys goods valued at approximately 5% of the gross national product in industrialized countries. Billions of dollars have to be spent annually (about $250 billion per year in the United States alone) to replace or repair corrosion-related damage or to prevent corrosion. Moreover, corrosion can weaken the strength of structures made from iron and change their appearance. Actually, corrosion is a slow form of burning. In short, rusting is a prime destructive mechanism that affects a society that places its trust and investments in iron and steel. Corrosion or degradation involves a deterioration of material when exposed to an environment, causing a loss of material. The most common case is the corrosion of metals, such as steel, by water. The changes brought about by corrosion include weight loss or gain, material loss, or changes in physical and mechanical properties.

Metal corrosion involves oxidation-reduction reactions in which the metal is lost by dissolution at the anode (oxidation). The electrons travel to the cathode, where the reduction occurs, while the electrons move all through a conducting solution or electrolyte. A positive and a negative pole, called the cathode and the anode, respectively, are thereby created with a current flow between them. Thus the process of corrosion is electrochemical.

For corrosion to occur, certain conditions must be present. These are (1) a potential difference between the cathode and the anode to drive the reaction; (2) an anodic reaction; (3) an equivalent cathodic reaction; (4) an electrolyte for the internal circuit; and (5) an external circuit where electrons can travel. In the corrosion of iron in water, the reactions differ according to whether oxygen is present. The typical reactions in a de-aerated medium are essentially an oxidation reaction releasing ferrous ions into the anode solution and a reduction reaction emitting hydrogen gas at the cathode. In the presence of oxygen, a complementary cathode reaction involves oxygen being reduced to water.

Some measures adopted to prevent corrosion in metals are cathodic protection, use of inhibitors, coating, and forming a passivating film. Protection of concrete, on the other hand, can be accomplished by coating, avoiding corrosive pH of the water with which the concrete is in interaction, avoiding excessive concentrations of ammonia, and avoiding de-aeration in pipes. Pipelines are an essential infrastructure that plays a significant role in a nation's economy, social well-being, and quality of life. Most of the pipes used in pipelines are made of metals, for example, cast iron and steel, and they located underground, in the soil. It is estimated that about 85% of water distribution pipes are cast iron and steel. Due to their long-term service and exposure to the aggressive environment in soil, aging and deterioration of metal pipes have resulted in an unexpectedly high rate of failures. As is well appreciated, the consequence of pipe failures can be socially, economically, and environmentally catastrophic, resulting in massive disruption of daily life, considerable economic loss, widespread flooding, and subsequent environmental pollution and even casualties. Therefore, there is a well-justified need to thoroughly investigate the causes of pipe failures.

An example of a traditional lab procedure for measuring corrosion is as follows. First, partially mask brass and mild steel samples using scotch tape, leaving only a 1 cm$^2$ exposed area for each of two electrodes. Second, immerse the partially masked brass and mild steel electrodes in an NaCl salt solution. Third, connect a multimeter (set to the low impedance current measuring mode) to the two electrodes such that the positive and negative terminals are connected to the brass and steel, respectively. Fourth, record the measured galvanic current every minute, for 15 minutes.

From the recorded measurements the corrosion penetration rate can be calculated in terms of the thickness or weight loss where the metal corrodes the surface uniformly across an area.

This method involves the exposure of a weighed piece of test metal or alloy to a specific environment for a specific time. A thorough cleaning follows this to remove the corrosion products and then to determine the weight of the lost metal due to corrosion.

Disadvantages of the traditional corrosion lab experimentation described above are as follows. First, the setup is old and has been used for a long time. Second, usually the experiment can be conducted one time per class with little student interaction. Third, conditions are fixed and cannot be changed due to instrumentation constraints. Fourth, only one parameter affecting the corrosion is studied. Usually, the impact of the salt concentration at 5% is studied, but that does not give any knowledge about the other factors, even different salt concentration. Fifth, there are no innovations in the experiment, which cannot serve advanced research. Sixth, many calculations are necessary, and no real-time monitoring is possible during the experiment, so any mistakes or problems cannot be apparent until the experiment is finished, and the calculations are done. Seventh, instrumentation uses are fundamental and don't serve either the research sector or the industrial sector. Eighth, the experiments are conducted on-site, and there are many safety restrictions, especially the number of students.

Thus, a material degradation monitoring system solving the aforementioned problems is desired.

SUMMARY

The material degradation monitoring system can be embodied as a remote laboratory that supports a remote experimentation facility for technological education, research-oriented tutorials, and industrial applications. The system includes different physical processes, which allows for multiple test samples to be tested under various environmental conditions, and which are controlled in real time through dedicated digital electronics connected to a local server, as well as a network connection allowing remote clients to interact with the process. The use of didactic models in industrial engineering provides students with an enhanced experimental environment to design industrial requirements. Students using mobile devices, such as smartphones, tablets, or PDAs can interact with physical laboratory hardware. Through a mobile device interface, the user can verify what's happening on laboratory hardware when they change the system parameters in real time.

In one embodiment, the material degradation monitoring system includes a base plate; a test chamber located on the base plate; a material holding unit located on the base plate and spaced apart from the test chamber, the material holding unit being capable of holding at least one material to be tested in the test chamber; a material transfer unit located proximate to the material holding unit and test chamber; and a controller that directs the transfer unit to move the material holding unit to the test chamber.

The material holding unit is capable of holding two materials to be tested and includes at least one electrode for conducting tests.

The material holding unit may include at least one ferromagnetic disc, the material transfer unit being attached to the material holding unit via the at least one ferromagnetic disc.

The material holding unit may include a material holding unit base having a ball actuated by a spring solenoid; and a material holding unit upper module, the material holding unit base securing the material holding unit upper module when the ball is actuated by the spring solenoid.

The material holding unit may include an RFID tag.

The controller may be remotely accessed through a network, such as the Internet.

In another embodiment, the material degradation monitoring system includes a base plate; a test chamber located on the base plate; first and second material holding units located on the base plate and spaced apart from the test chamber, the first material holding unit having a first base portion and first and second upper holding portions, the first base portion accommodating the first and second upper holding portions, each of the first and second upper holding portions being capable of holding at least one test material, the second material holding unit having a second base portion and third and fourth upper holding portions, the second base portion accommodating the third and fourth upper holding portions, each of the third and fourth upper holding portions being capable of holding at least one test material; a material transfer unit located proximate to the first and second material holding units and the test chamber; and a controller that directs the transfer unit to move one of the first, second, third or fourth upper holding portions to the test chamber.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The material degradation monitoring system was developed to enable a user to test multiple test samples under various environmental conditions. The test parameters can be controlled in real time through dedicated digital electronics connected to a local server, as well as a network connection allowing remote clients to interact with the system.

Figure 1:
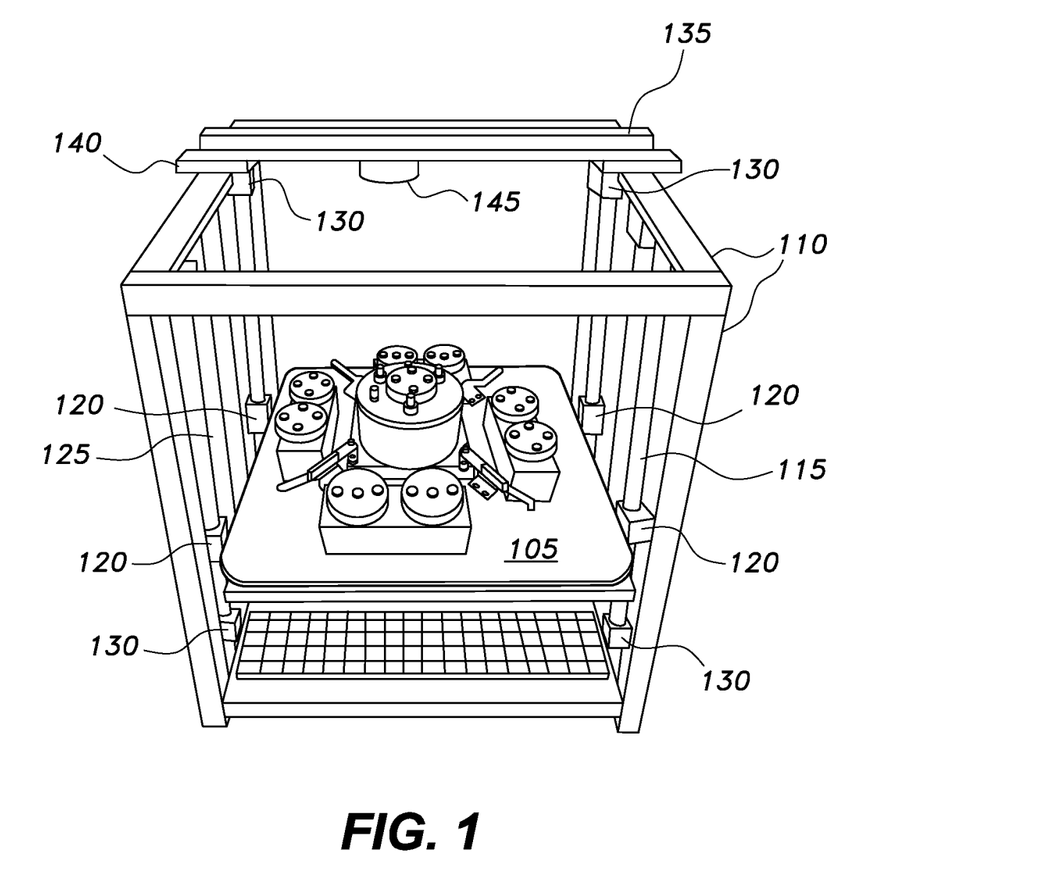
FIG. 1 is a diagrammatic perspective view of the material degradation monitoring system.

As shown in FIG. 1, the material degradation monitoring system 100 has a base plate 105 located within a main frame 110, the base plate 105 being movable along sliding shafts 115 by using sliding blocks 120 mounted on the shafts 115. Power screws 125 are connected to stepper motors and move the base plate 105 in a vertical direction along the sliding shafts 115.

The main frame 110 may be made using a T-slots aluminum profile. There are two power screws 125 connected to two stepper motors that are responsible for the vertical movement of the base plate 105. The two sliding shafts 115 are located on opposite sides of the base plate 105 and are fitted with the sliding blocks 120. Fixed blocks 130 with T-fittings are located at the top and bottom of each of the sliding shafts 115, the T-fittings being inserted into T-slots in the top and bottom rails of the frame 110 to permit longitudinal movement of the shafts 115 forward and backward in the frame 110.

A sliding bridge 135 is driven by a stepper motor to move the bridge forward and backward via sliding carriages 140 on opposite sides of the top pf the frame 110, each of the carriages 140 having two ball bearings. A material transfer unit 145 is attached to the sliding bridge 135 by bolted joints. The main frame 110 is equipped with four cameras placed at the corners to monitor the system to assist in moving the material transfer unit 145.

Figure 2:
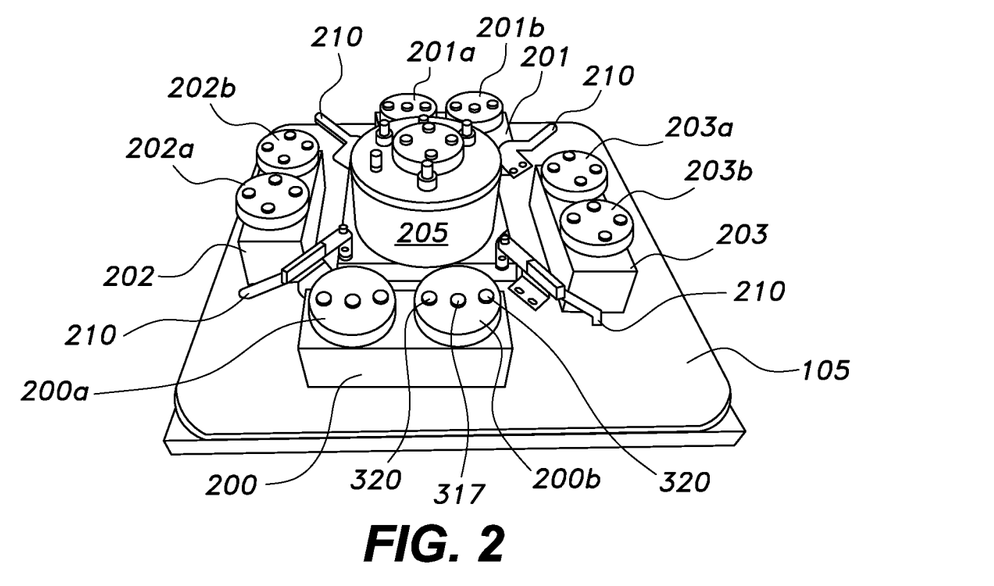
FIG. 2 is a diagrammatic perspective view of the base plate of the material degradation monitoring system of FIG. 1 having a plurality of material holding units and a test chamber.

As shown in FIG. 2, the base plate 105 may have a plurality of material holding unit bases 200, 201, 202, 203 and a test chamber 205 supported thereon. Each of the material holding unit bases 200, 201, 202, 203 has two material holding units 200a, 200b, 201a, 201b, 202a, 202b, 203a, 203b. Adjustable toggle clamps 210 secure the material holding unit bases 200, 201, 202, 203 to the base plate 105. Although FIG. 2 depicts the material holding unit bases holding two material holding units, it is contemplated that a material holding unit base could accommodate only one material holding unit or possibly three or more material holding units. It is further noted that there could be more or less material holding unit bases.

Figure 3:
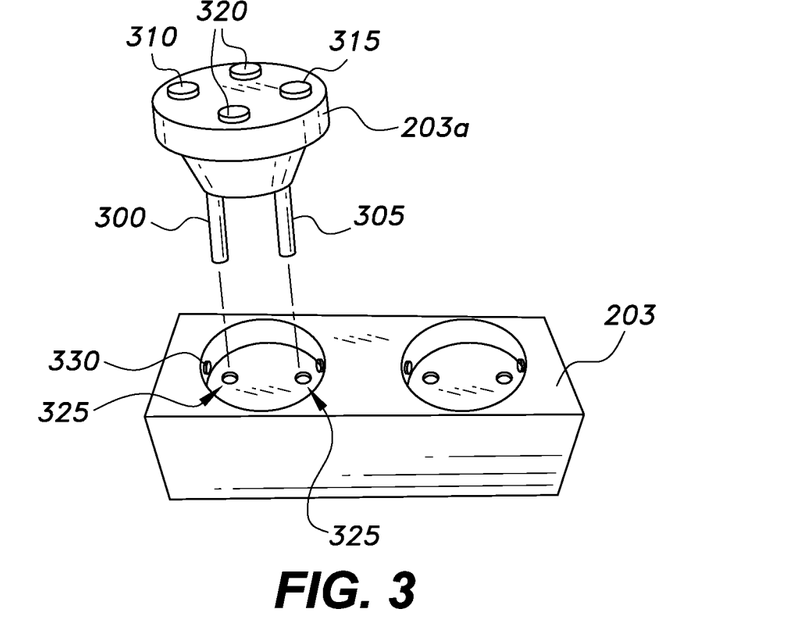
FIG. 3 is a diagrammatic partially exploded perspective view of a material holding unit base of the material degradation monitoring system of FIG. 1.

As shown in FIG. 3, the material holding unit, e.g., material holding unit 203a, may be a dual-material material holding unit that holds two test materials 300 and 305. Test materials 300 and 305 have conductor discs 310 and 315 or contacts located on top of the material holding unit 203a. It is noted that a single-material material holding unit is possible (see, e.g., 200a, 200b and 201a, 201b) and includes a single conductor disc 317. The conductor discs are used to measure real-time current and voltages induced by the electrodes. The data measurements can be logged for further analysis and processing.

In some embodiments, a two-material material holding unit can have two different electrodes constructing a corrosive galvanic cell in order to measure the current flow and the voltage difference at different conditions. A one-material material holding unit can measure the EMF (voltage) of a material by using a zero-voltage electrode (Calomel Reference Electrode).

In some embodiments, each of the material holding units may be 3-D printed and contain a special pair of electrodes with a built-in embedded RFID tag with a unique identifier that enables wireless detection so that a target unit can be selected according to test requirements. There may be several different metal electrodes that can be used for additional testing.

Ferromagnetic steel discs 320 are also located on top of the material holding unit 203a and are used to move the material holding unit 203a from the material holding unit base 203 to the test chamber 205 via the material transfer unit 145. The siding bridge 135 contains the controller and the transmitter of the RFID.

The material holding unit base 203 has two slots 325 to accommodate each of the materials 300 and 305 and a ball lock mechanism 330 to engage the sides of the material holding unit 203a. The ball lock mechanism ensures that the material holding unit 203a is mounted on the base 203 firmly.

Figure 4:
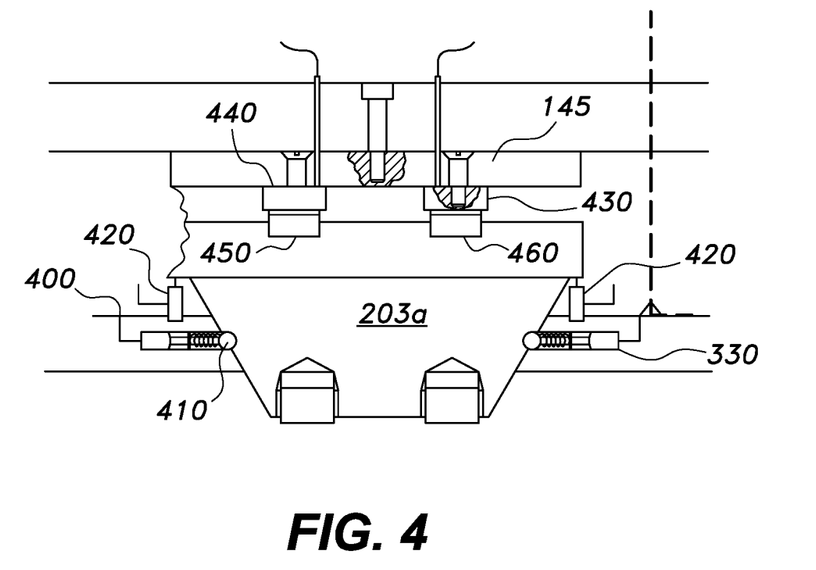
FIG. 4 is a diagrammatic side view of a material holding unit of the material degradation monitoring system of FIG. 1 engaged by a ball lock mechanism.

As shown in FIG. 4, the material holding units, e.g., material holding unit 203a, are each engaged by a ball lock mechanism 330. The ball lock mechanism 330 includes a user-controlled spring return linear solenoid actuator 400 and a stainless steel ball 410 attached to it to lock or release the material holding unit 203a. In addition, two vertical microswitches (VMS) 420 are used to ensure that the material holding unit 203a is placed at the right position and to notify the user that the material holding unit 203a has been mounted successfully.

The material transfer unit 145 has two horizontal microswitches 430, 440 that are to come in contact with conducting discs 450, 460 at the material holding unit 203a in order to transmit the measured voltage or current, and to indicate when the material transfer unit 145 is fully engaged with the material holding unit 203a.

In some embodiments, the material transfer unit 145 is 3D-printed and has two functions, including holding a material holding unit 200a-203b during the changing process and during testing, and second providing the required mechanism for transmitting the electrical signals from the electrodes.

Electromagnetic coils are embedded inside the material transfer unit 145, and when an electromagnetic coil is triggered, it provides the required holding magnetic force to lift the corresponding material holding unit.

Figure 5A:
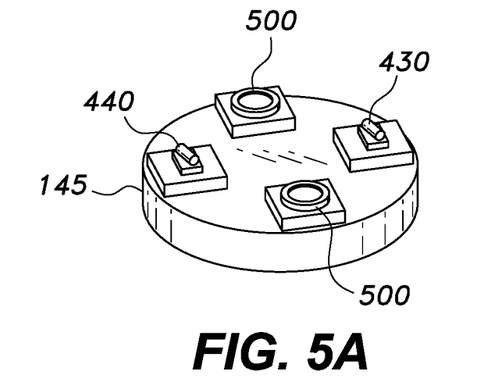
FIG. 5A is a diagrammatic perspective view of the material transfer unit of the material degradation monitoring system of FIG. 1.
Figure 5B:
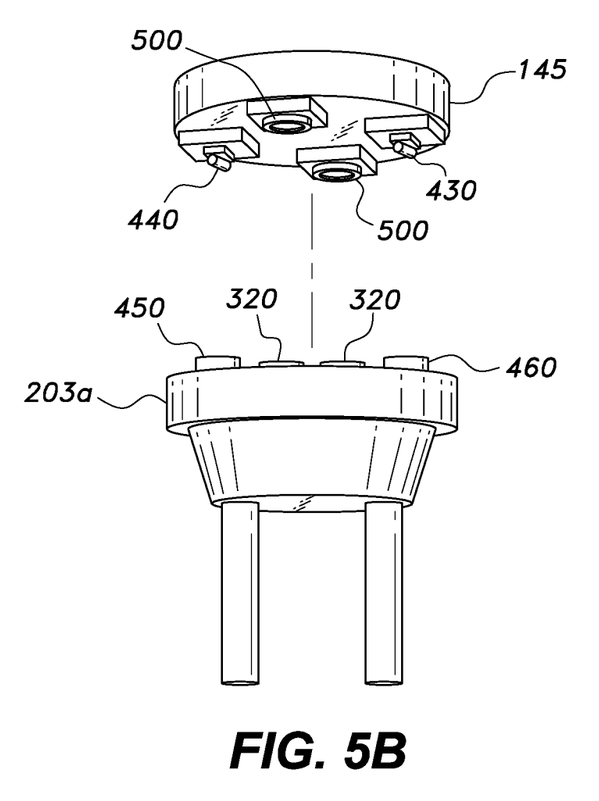
FIG. 5B is a diagrammatic partially exploded side view of the material transfer unit of FIG. 5A.

As shown in FIGS. 5A and 5B, a material holding unit 200a-203b is releasably attached to the material transfer unit 145 by two electromagnetic discs 500 that contain grooves. The material transfer unit 145 is mounted by bolted joints to the sliding bridge 135 in order to move a material holding unit from a material holding unit base 200-203 to the test chamber 205, and vice versa. The material transfer unit 145 has two horizontal micro switches 430,440 that perform two functions, including connecting to the conducting discs (contacts) of a material holding unit in order to transmit the measured voltage or current, and to send a signal to indicate when the material transfer unit 145 is fully engaged with a corresponding material holding unit.

As shown in FIG. 5B, the material transfer unit 145 can be aligned with a material holding unit, such as material holding unit 203a, using the sliding bridge 135 so that the microswitches 430, 440 align with the conducting discs (contacts) 450, 460 and the electromagnetic discs 500 align with the ferromagnetic steel discs 320. Once the material holding unit 203a is engaged with the material transfer unit 145, the material transfer unit 145 can move the material holding unit 203a to the test chamber 205.

Figure 6A:
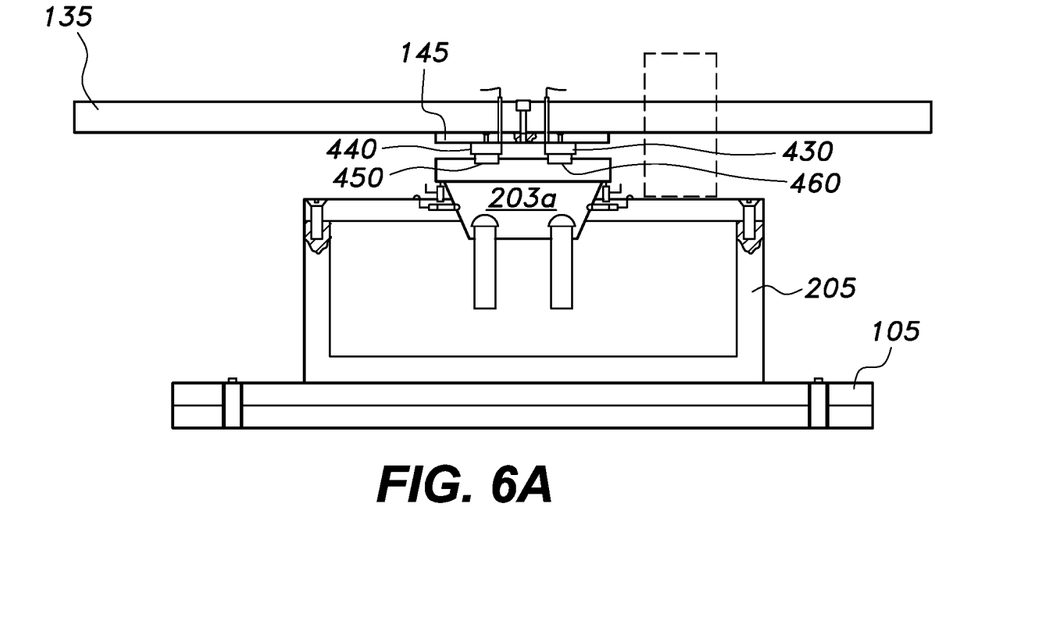
FIG. 6A is a diagrammatic front view of a smart electrodes interchangeable unit (SEIU) positioned over a test chamber in the material degradation monitoring system of FIG. 1.
Figure 6B:
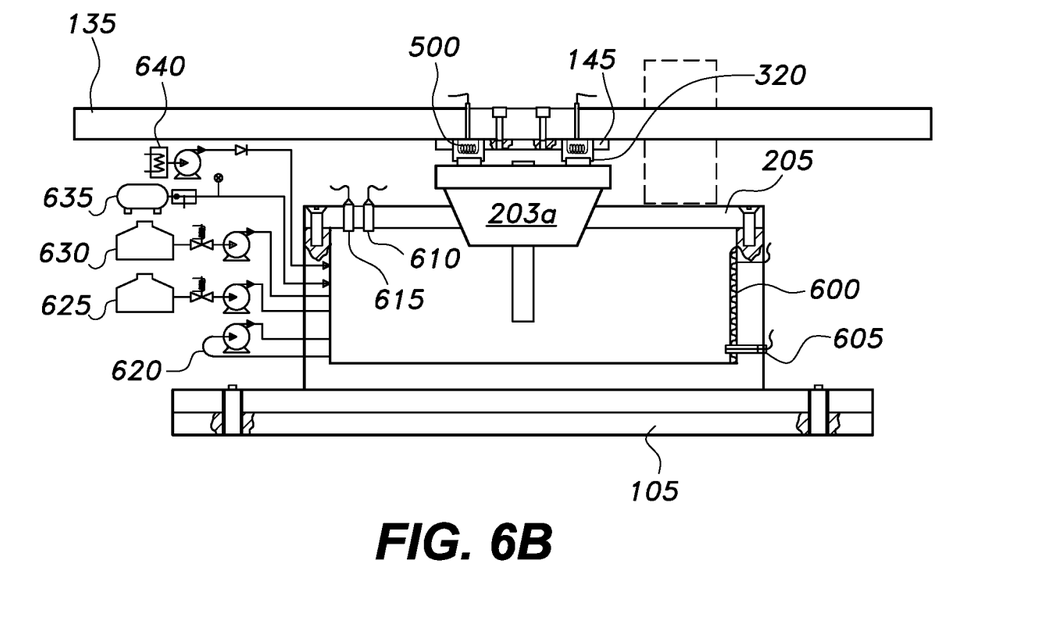
FIG. 6B is a diagrammatic side view of a smart electrodes interchangeable unit (SEIU) positioned over a test chamber in the material degradation monitoring system of FIG. 1.

FIGS. 6A and 6B show the material holding unit 203a after it has been moved to the test chamber 205 by the material transfer unit 145 via the sliding bridge 135. The material transfer unit 145 is engaged with the material holding unit 203a via microswitches 430, 440, which align with the conducting discs 450, 460 of the material holding unit 203a.

As shown in FIG. 6B, the electromagnetic discs 500 of the material transfer unit 145 are engaged with the ferromagnetic steel discs 320 of the material holding unit 203a.

The test chamber 205 may be connected to many sensors, including a solution level sensor 600, a salt solution concentration sensor 605, a pressure sensor 610, a steam sensor 615, etc. A circulation pump 620 is connected with the test chamber 205 to mix salt water from a salt water tank 625 with pure water from a pure water tank 630. A pressurized air tank 635 is connected with the test chamber 205 to add pressure to the system. A steam generator tank 640 is connected with the test chamber 205 to add steam to the system.

Examples of sensors and their operation are as follows. A temperature and humidity sensor measures the temperature and humidity inside the test chamber 205 and the data is transmitted to the main controller through a Signal Conditioning Unit (SCU), which processes and transmits sensor data to a main control unit. The SCU is responsible for sensor signal amplification and filtering. The main control unit maintains the temperature and humidity at the desired values by actuating the heater and steamer based on readings from this sensor.

A turbidity sensor detects water quality by measuring the levels of turbidity or opaqueness. It detects suspended particles in water by measuring the light transmittance and scattering rate, which changes with the amount of Total Suspended Solids (TSS) in water.

A dissolved oxygen (DO) sensor measures the dissolved oxygen (DO) in water, which is one of the important parameters that reflect water quality.

An analog pH Sensor measures the pH of a solution and reflects its acidity or alkalinity.

A water flow sensor measures the rate of a liquid flowing through it.

An Oxidation-Reduction Potential (ORP) sensor measures the ability of oxidation and reduction of an aqueous solution and can indicate the relative degree of oxidizing or reducing. If the ORP is high, then chemical oxidation is strong, while if the potential is lower, then oxidation is weaker. The positive potential means that a solution shows a certain degree of oxidation, while a negative potential means that a solution shows a certain degree of reduction. ORP is an important index of water quality detection. Although it cannot separate water quality independently, it can be combined with other water quality indexes to better reflect the ecological environment.

An electrical conductivity sensor is used to measure the electrical conductivity of solutions. The solution's conductivity is a measure of its ability to conduct electricity. Conductivity is an important parameter of water quality. It can reflect the extent of electrolytes present in water.

A non-contact capacitive liquid level sensor is used to detect the presence and the level of the water inside a tank and is a safety feature.

The operation of the material degradation monitoring system 100 is controlled with a computer, which can be a stand-alone system, or networked as a LAN, or be connected to the Internet for remote operation. All systems described above can be controlled, and if networked, can be remotely controlled from anywhere in the world.

For example, a user can determine which material holding unit should be tested and send commands to the material degradation monitoring system 100 to move a specific material holding unit to the test chamber 205. The material transfer unit 145 would then identify the material holding unit using an embedded RFID, and engage and move the material holding unit to the test chamber 205. The conditions of the test chamber could also be controlled by the user by adjusting the temperature, pressure, water level, salt water level etc. Sensors monitor the conditions in the test chamber 205 to give the user feedback so that further adjustment of the conditions in the test chamber can be made. This data is all recorded so that it can later be analyzed.

Figure 7:
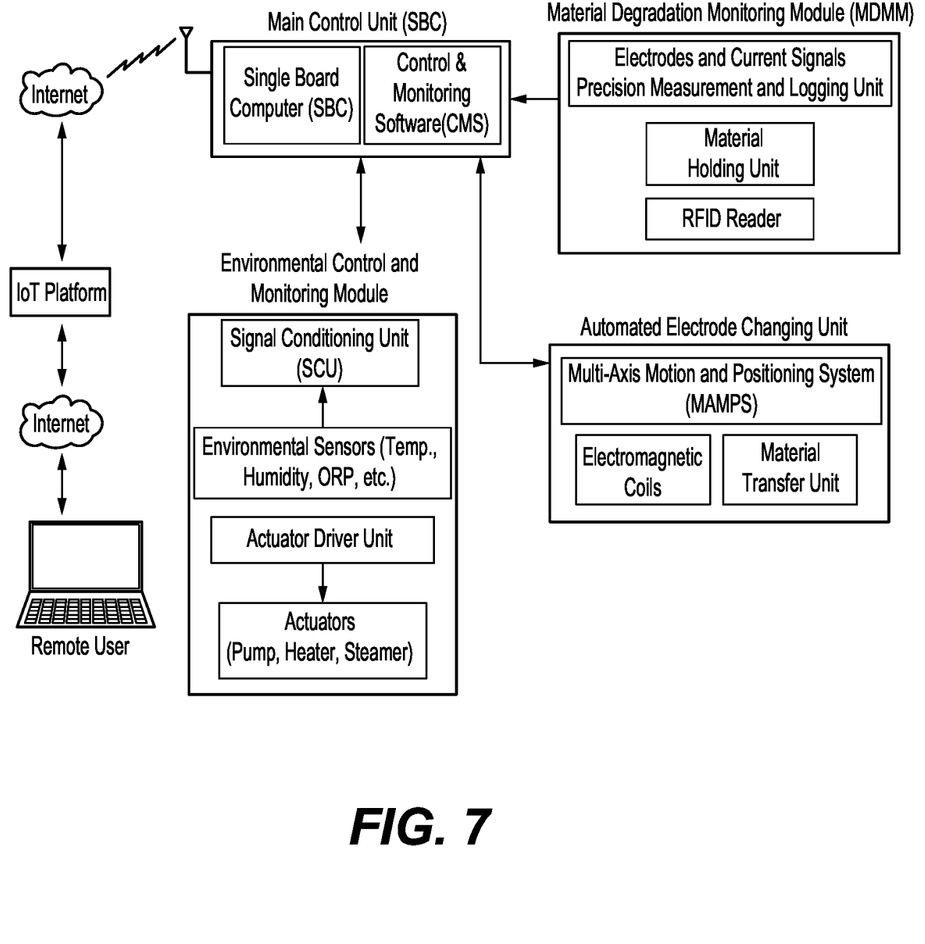
FIG. 7 is a block diagram of the material degradation monitoring system of FIG. 1.

FIG. 7 is a block diagram of a material degradation monitoring system. The main control unit includes a single board computer (SBC), which is a complete computer built on a single circuit board, with microprocessor(s), memory, and input/output (I/O) and other features needed of a working computer, and may be equipped with an integrated Microcontroller unit (MCU). The microcontroller unit (MCU) collects the processes sensor data and transmits the data to the SBC using Inter-Integrated Circuit (I2C) communication protocol, I2C enables transmitting the reading from all sensors by using only a 2-wire communication bus.

Control and Monitoring Software (CMS) is implemented as the core software and the primary user interface for conducting experiments and monitoring conditions. The user can define experiment parameters (Temperature, Humidity, Flow) to control the actuators, in addition to conducting, monitoring and logging material degradation experiments.

The CMS interacts and communicates with all other modules to collect current and voltage data, collect environmental data, control actuators, stream test and analysis data to an IoT platform dashboard and receive remote user commands and settings, and send commands to automated electrode changing module to control positioning of the material transfer unit 145 and base plate 105, and release and hold a material holding unit.

The environmental control and monitoring module controls the environmental sensors and actuators for items such as pumps, heaters and steamers. An actuator driver unit receives command signals from a main control software to set the heater, steamer, and water pump ON or OFF, and also provides the necessary power to operate these actuators.

The material degradation monitoring module controls the material holding unit, electrode voltage and current to conducting discs and micro switches, logs data and also includes an RFID reader to identify each material holding unit.

The automated electrode changing module controls movement of the material transfer unit 145 and the base plate 105, and the operation of the electromagnetic coils to engage and disengage a material holding unit. It provides 3-axis mechanical motion mechanism enabling automatic changing of the material holding unit. This feature provides the user with the ability to choose the desired electrode pairs during the experiment setup. The system will automatically change the existing material holding unit and replace it with the desired one. Each material holding unit has an embedded RFID tag for identification and is engaged with the material transfer unit via electromagnetic coils Remote monitoring and control of the material degradation monitoring system can be achieved through the use of a specialized Internet of Things (IoT) platform that integrates and communicates with the developed control and monitoring software installed at the Single Board Computer (SBC). A custom dashboard hosted in the IoT Platform acting as a secured access web-based application enables remote users to interact with the material degradation monitoring system and conduct experiments remotely. A web camera attached to the SBC provides real-time video broadcasting for the experiment.

Security, availability, and support for a wide range of hardware and integration are among the benefits of using a commercial IoT platform.

Another approach is to use remote desktop software, which is a client application that allows users to have access to a remote or "host" computer over the Internet. Users can then control and use the resources hosted on that computer. In that way, a remote user can get the privilege to access the SBC and gain control of the main control software and experimentation.

Figure 8:
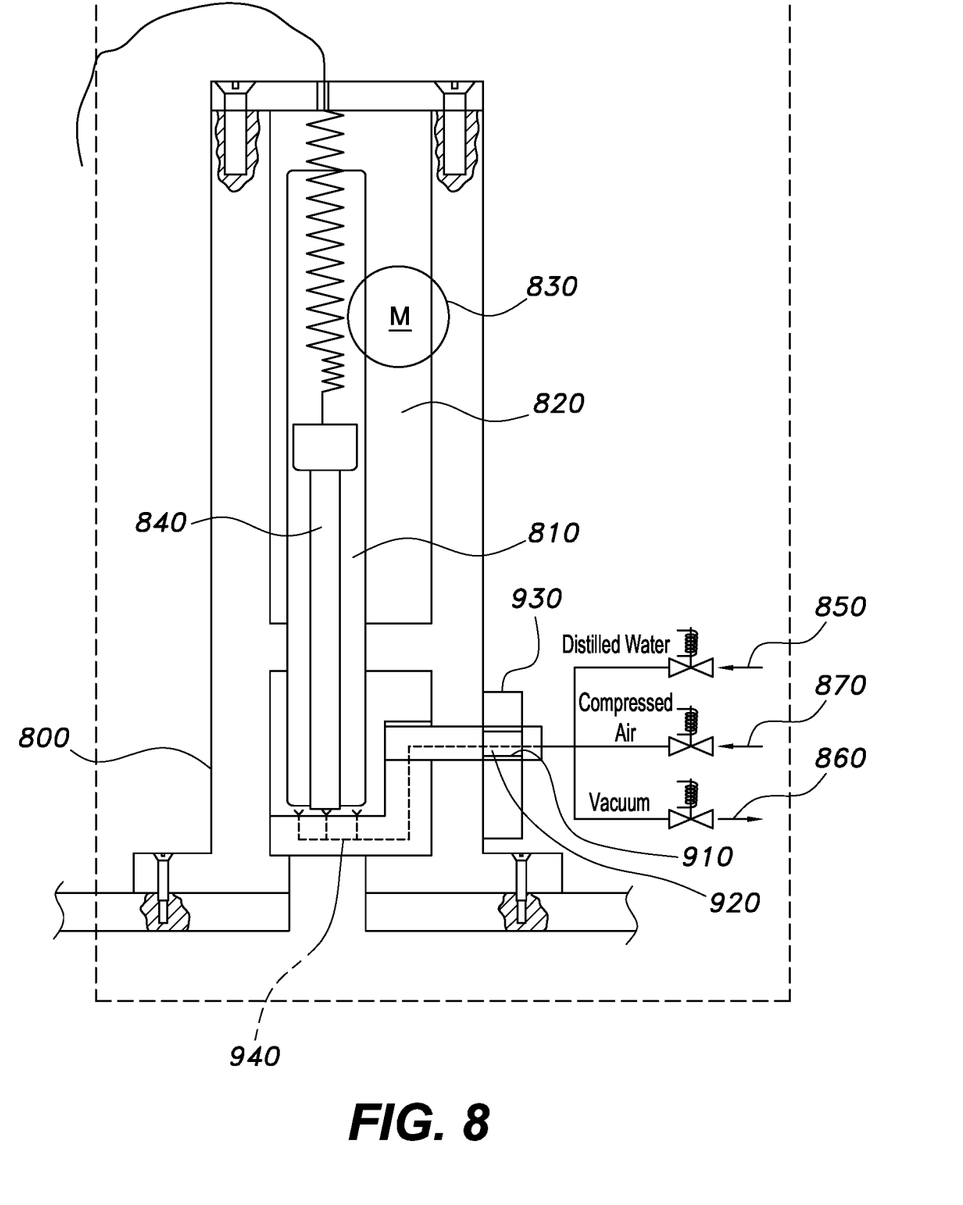
FIG. 8 is a diagrammatic side view of a sliding electrode unit (SEU) in a test chamber of the material degradation monitoring system.

FIG. 8 shows a sliding electrode unit (SEU) 800 of the test chamber 205. SEU 800 is connected at the top of the test chamber 205 by bolted joints. A sliding electrode jacket (SEJ) 810 moves up and down by a rack and pinion gear 820 that is connected to a geared motor 830. A testing probe 840 is located within the SEJ 810.

SEU 800 is equipped with a smart cleaning system to preserve the testing probe 840 from damage and to keep the accuracy of measurements. During testing, the testing probe 840 is lowered into the test chamber 205. When the testing probe 840 is moved up after finishing the testing procedure, the head of the testing probe 840 contains contaminants from the test chamber solution. The cleaning process starts by spraying distilled water from pump 850, then vacuum and drain the water by the vacuum process from vacuum 860, then dry by supplying air from condenser 870, and finally another vacuum cycle will be carried out by vacuum 860 to ensure no leftover water exists.

Figure 9:
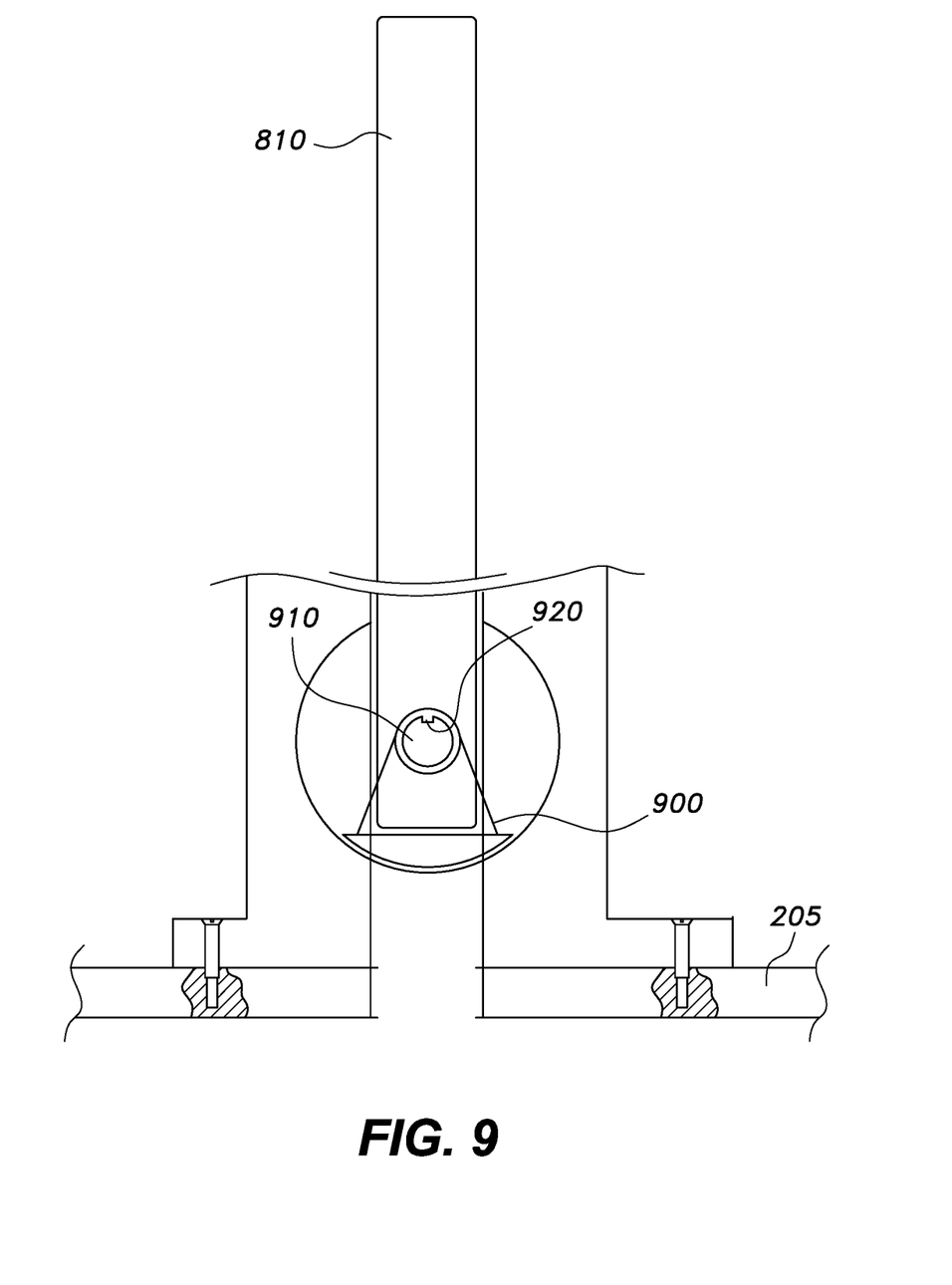
FIG. 9 is a diagrammatic front view of a sliding electrode unit (SEU) in a test chamber of the material degradation monitoring system, showing the swinging door in a closed position.

FIG. 9 shows a swinging door 900 of the SEU 800. The swinging door 900 is connected with a shaft 910 through a key 920. The shaft 910 is attached to a bore motor 940 through another key that drives the swinging door 900. The swinging door 900 is embedded with pipelines 930 that are used for the cleaning process. The main cleaning pipeline comes through the center of the swinging shaft. When the swinging door 900 is in the closed position, as shown in FIG. 9, the testing probe 840 can be cleaned without mixing the cleaning water with the chamber solution.

Figure 10:
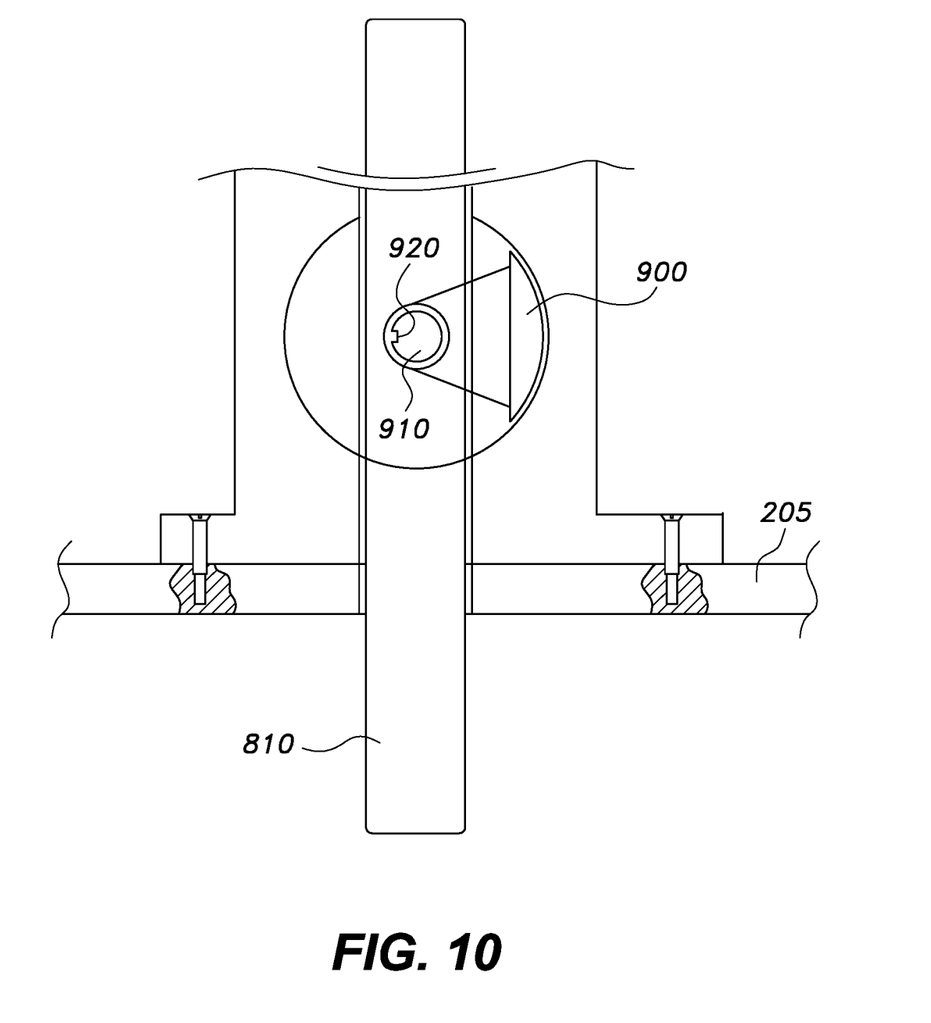
FIG. 10 is a diagrammatic front view of a sliding electrode unit (SEU) in a test chamber of the material degradation monitoring system, showing the swinging door in an open position.

FIG. 10 shows the swinging door 900 in the open position, which allows the SEJ 810 to move down into the test chamber 205.

It is to be understood that the material degradation monitoring system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A material degradation monitoring system comprising:
a base plate;
a test chamber located on the base plate;
a material holding unit located on the base plate and spaced apart from the test chamber, the material holding unit being capable of holding at least one material to be tested;
a material transfer unit located proximate to the material holding unit and the test chamber; and
a controller directing the transfer unit to move the material holding unit into the test chamber,
wherein the material holding unit comprises at least one ferromagnetic disc; and the material transfer unit comprises at least one electromagnetic coil selectively attachable to the at least one ferromagnetic disc of the material holding unit for moving the material holding unit into the test chamber.

2. The material degradation monitoring system of claim 1, wherein the material holding unit is capable of holding two materials to be tested.

3. The material degradation monitoring system of claim 1, wherein the material holding unit is capable of holding a single material and a zero voltage reference electrode for measuring the electromotive force (EMF) of the single material.

4. The material degradation monitoring system of claim 1, wherein the material holding unit comprises at least one electrode for conducting tests.

5. The material degradation monitoring system of claim 1, wherein:
the material holding unit further comprises a pair of horizontal microswitches; and
the material transfer unit further comprises a pair of conducting discs so that when the horizontal microswitches and the conducting discs are aligned with and contact each other, a signal indicating the material transfer unit is ready to lift and move the material holding unit and the voltage or current conducted between the horizontal microswitches and the conducting discs is transmitted.

6. The material degradation monitoring system of claim 1, wherein the material holding unit comprises an RFID tag identifying the at least one material to be tested.

7. The material degradation monitoring system of claim 1, wherein the controller comprises a communications module permitting remote access to the controller.

8. The material degradation monitoring system of claim 1, wherein the controller comprises a communications module permitting remote access to the controller through the Internet.

9. A material degradation monitoring system comprising:
a base plate;
a test chamber located on the base plate;
a material holding unit located on the base plate and spaced apart from the test chamber, the material holding unit being capable of holding at least one material to be tested;
a material transfer unit located proximate to the material holding unit and the test chamber; and
a controller directing the transfer unit to move the material holding unit into the test chamber,
wherein the material holding unit comprises: a material holding unit base having a spring solenoid and a ball plunger selectively actuated by the solenoid to extend to a lock position and retract to a release position; and a material holding unit upper module, the material holding unit upper module being secured to the material holding unit base when the ball plunger is in the lock position and released from the material holding unit base when the ball plunger is in the release position.

10. A material degradation monitoring system comprising:
a base plate;
a test chamber located on the base plate;
a material holding unit located on the base plate and spaced apart from the test chamber, the material holding unit being capable of holding at least one material to be tested;
a material transfer unit located proximate to the material holding unit and the test chamber;
a controller directing the transfer unit to move the material holding unit into the test chamber; and
a plurality of actuators connected to said test chamber and to said controller, the actuators being selected from the group consisting of temperature actuators, pressure actuators, humidity actuators, salt level actuators, bubble formation actuators, turbulent flow actuators, steam actuators, water level actuators, pH actuators, conductivity actuators, turbidity actuators, oxygen level actuators, and Oxidation-Reduction Potential (ORP) actuators, the actuators selectively changing environmental test conditions in said test chamber under user control; and an automated electrode changing module connected to said material holding unit, the automated electrode changing module having a plurality of test probe sensors selected from the group consisting of temperature test probes, pressure test probes, humidity test probes, salt level test probes, bubble formation test probes, turbulent flow test probes, steam test probes, water level test probes, pH test probes, conductivity test probes, turbidity test probes, oxygen level test probes, and Oxidation-Reduction Potential (ORP) test probes for selectively testing the effect of a selected environmental condition on degradation of the material being tested.

11. The material degradation monitoring system of claim 10, wherein said automated electrode changing module comprises a swinging door permitting insertion of a single test probe at a time into the material holding unit.

12. The material degradation monitoring system of claim 11, wherein said automated electrode changing module further comprises an automated test probe cleaning system having:
- a water sprayer;
- an air dryer; and
- a vacuum for completing drying and removing debris.

13. The material degradation monitoring system of claim 12, wherein said swinging door has a closed position preventing water from the water sprayer of said cleaning system from contaminating the test chamber during cleaning of one of the test probes.

\* \* \* \* \*